United States Patent [19]
Arnold et al.

[11] 3,789,585
[45] Feb. 5, 1974

[54] APPARATUS FOR CLEANING GASES

[75] Inventors: Orlan M. Arnold, Grosse Pointe Park, Mich.; Carlo A. Vancini, Stamford, Conn.

[73] Assignee: Peabody Engineering Corporation, New York, N.Y.

[22] Filed: June 23, 1971

[21] Appl. No.: 155,916

[52] U.S. Cl.................. 55/222, 55/223, 55/228, 55/235, 55/238, 55/257, 55/346, 55/418, 55/449, 261/79 A
[51] Int. Cl............................................ B01d 47/06
[58] Field of Search.................. 55/87, 92–95, 220, 55/222, 223, 221, 228, 235–239, 248, 257, 258, 260, 346, 418, 449; 261/79 A, DIG. 54, 115–118, 160, 161

[56] References Cited
UNITED STATES PATENTS

| | | | |
|---|---|---|---|
| 784,748 | 3/1905 | Meehan | 261/118 |
| 895,790 | 8/1908 | Richards | 261/116 |
| 1,049,796 | 1/1913 | Anderson | 55/228 |
| 1,128,177 | 2/1915 | Moser | 55/240 |
| 1,846,248 | 2/1932 | Clarke | 261/79.1 |
| 2,039,692 | 5/1936 | Van Tongeren | 55/459 |
| 2,604,185 | 7/1952 | Johnstone et al. | 261/118 |
| 3,358,413 | 12/1967 | Kalika | 261/161 |
| 3,448,562 | 6/1969 | Wisting | 55/94 |
| 165,080 | 6/1875 | Eastman | 55/DIG. 20 |

FOREIGN PATENTS OR APPLICATIONS

| | | | |
|---|---|---|---|
| 682,131 | 11/1952 | Great Britain | 55/459 |
| 26,460 | 1902 | Switzerland | 261/116 |

Primary Examiner—Bernard Nozick
Attorney, Agent, or Firm—N. L. Leek; Robert H. Bachman

[57] ABSTRACT

A gas cleaning and drying apparatus wherein a gas stream is passed through an annular gas washing zone, a liquid spray from a fixed nozzle is passed radially outwardly through the gas stream in advance of said throat to remove suspended matter, a reservoir collects the droplets and suspended matter and a dryer unit receives the gas from which the matter has been so removed. The drying unit includes a slotted plate having baffles and deflectors for collecting and removing the liquid droplets.

36 Claims, 4 Drawing Figures

PATENTED FEB 5 1974  3,789,585

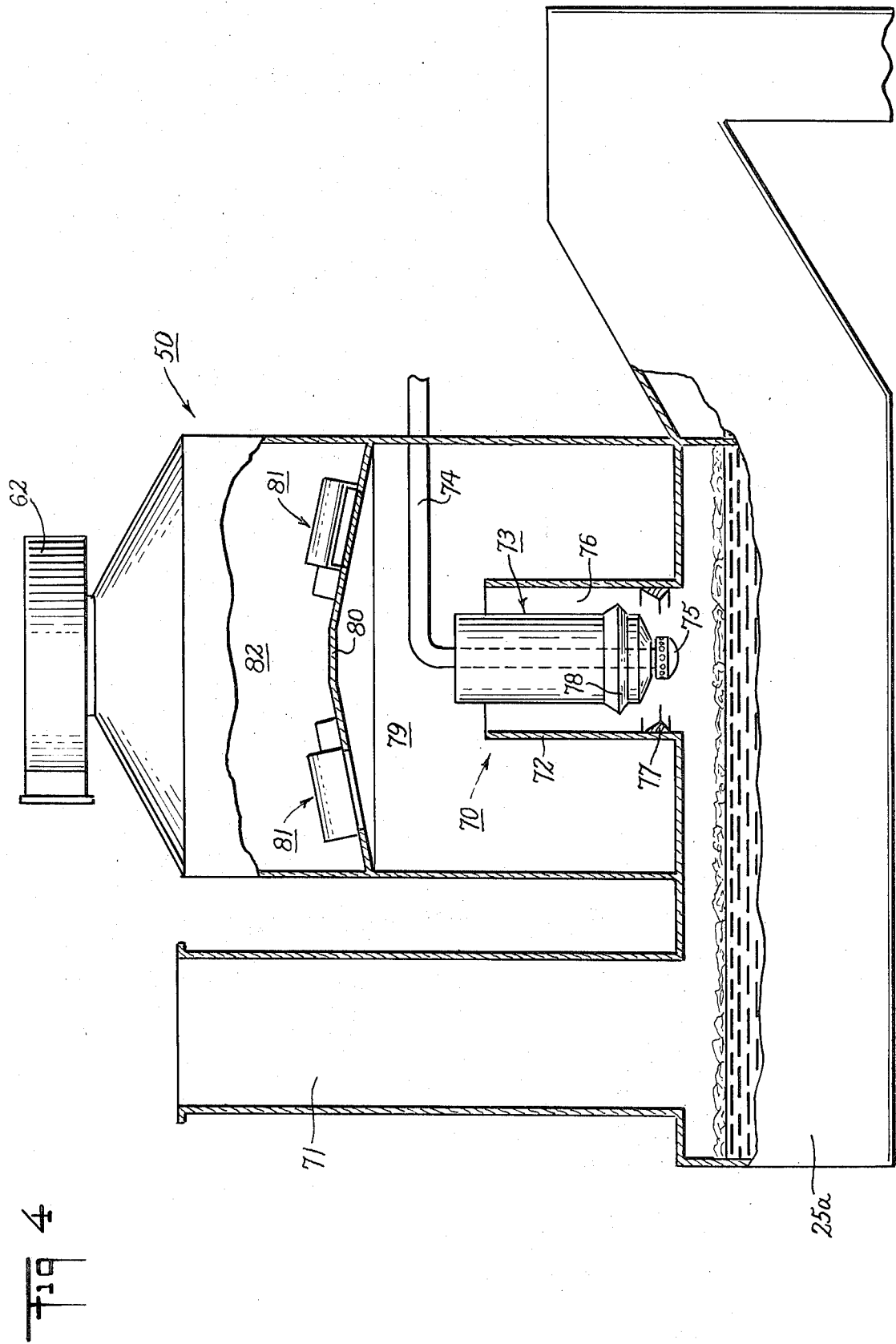

APPARATUS FOR CLEANING GASES

This invention relates to a method and apparatus for cleaning gases and more particularly to gas washing and drying apparatus wherein suspended matter or chemical components are subjected to a liquid spray under conditions to physically remove suspended particles or to make intimate contact with such chemical components.

An object of the invention is to provide an apparatus of the above type which is efficient in operation and may be used under various conditions of throughput and with various materials without substantial reduction in efficiency.

Another object is to provide an efficient apparatus of the above type without moving parts and without small passages or ports which would tend to become clogged during use.

Another object is to utilize the kenetic energy of a liquid spray from a stationary nozzle or the gas velocity produced by a venturi section or a combination thereof for effecting the removal and separation of the selected components from the input gas.

Another object is to provide a novel and improved apparatus of the above type which is suited for continuous operation without requiring shut down for cleaning or maintenance.

Various other objects and advantages will be apparent as the nature of the invention is more fully disclosed.

A feature of the invention is the use of a washing zone wherein the gas to be cleaned is passed through a uniform spray of the cleaning liquid derived from a stationary spray nozzle wherein the kinetic energy of the spray is used to cause the droplets of the spray to envelop and remove the particulate matter or drops suspended in the gas stream. In one embodiment the gas to be cleaned is caused to advance in an annular stream axially within a cleaning vessel through a radial spray produced from a stationary nozzle at the axis of the vessel or through an inwardly directed spray or through a combination thereof. When both the outwardly directed and inwardly directed sprays are used they may be offset axially or may be disposed in the same axial plane so that the sprays impinge on each other and form a restricted opening for the gases which produces a venturi effect.

The annular gas stream passes axially through an annular passage between the inner wall of the vessel and a central core at a velocity suited to cause the liquid droplets with their entrained matter to enter a reservoir while the gas stream is deflected into a drying zone wherein the entrained spray is removed.

The annular passage between the central core and the outer walls of the cleaning vessel may be restriced at or near its entrance end to form the inlet portion of a venturi section which increases the velocity of the gases and thus facilitates the separation of the spray droplets. The venturi thus formed is annular in section and extends around the periphery of the vessel. In some instances, depending upon the nature of the particulate material to be removed, the venturi action itself may be sufficient to cause the particulate material to be removed and deposited in the reservoir, in which case the spray may be omitted and a suitable supply of liquid fed to the venturi to effect the washing of the contaminants out of the gas.

In one embodiment the drying zone may comprise a barrier having openings for the passage of the gas with suitable deflectors to entrain the droplets and to return the collected liquid to the reservoir. The cool gases discharged from the dryer may be passed in heat transfer relationship with the incoming gases supplied to the washing unit for cooling the incoming gases and reducing the volume to be passed through the unit for treatment and also for heating the outgoing gases for reducing the relative humidity thereof so as to reduce or eliminate the formation of plume.

In order to reduce foaming when foam forming materials are being treated, the discharge end of the washing vessel may be outwardly flared for increasing the cross section of the gas passage and also for increasing the area of the material collected in the reservoir so that more bubbles are exposed for disintegration. Also deflecting fingers may be disposed in the annular passage in advance of the reservoir for mechanically engaging and breaking the bubbles which may be formed in the passage. A conveyor or other suitable means may be used to remove the sediment from the reservoir.

The specific nature of the invention will be better understood from the following description, taken in connection with the accompanying drawings in which certain specific embodiments have been set forth for purposes of illustration.

In the drawings:

FIG. 4 is a vertical section similar to FIG. 1 showing an embodiment wherein the drying unit is disposed above the washing unit.

Figure 1:
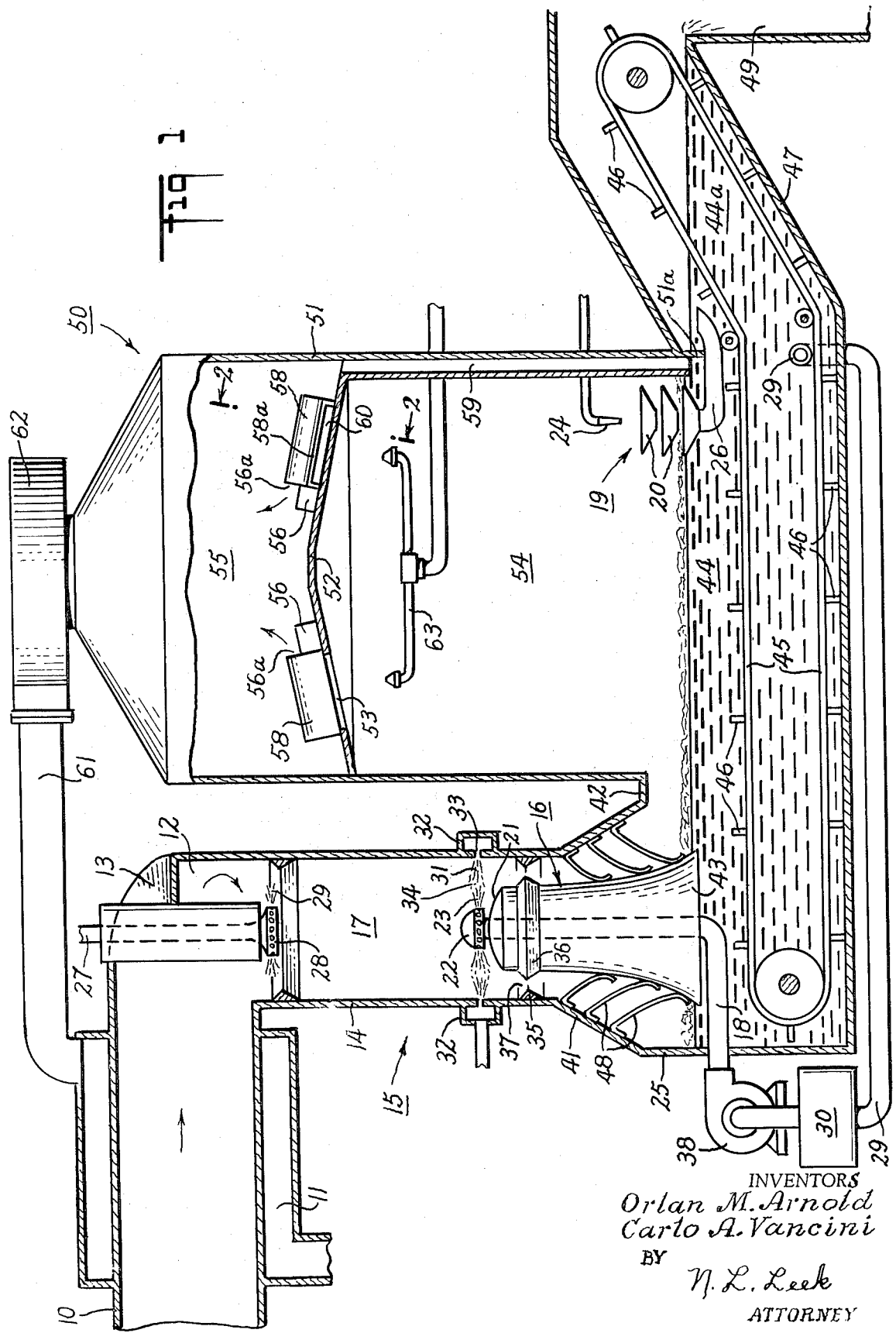
FIG. 1 is a vertical section through a gas washing and drying apparatus embodying the invention.

Referring to the drawings more in detail, the invention is shown as embodied in a washing and drying apparatus connected to receive gases for cleaning from a duct 10 passing through a heat exchange jacket 11 and tangentially through a helical passage 12 in a cover 13 into the top section of a cylindrical vessel 14 which constitutes the washing unit 15. The gas stream thus enters the top of the unit 15 tangentially and passes axially downward in a helical path along the inner periphery of the walls of the vessel 14.

A central core 16 extends upwardly in the vessel 14 to a point which forms the primary wash zone 17 and is carried on a pipe 18 which extends above the top surface 21 of the core 16 to constitute a nozzle 22 which is of a form adapted to discharge a spray 23 horizontally around the 360 degrees of the wash zone 17. The pipe 18 extends outwardly through a base 25 to be described and the top 21 of the core 16 is shown as of convex form for drainage purposes.

A pipe 27 may extend downwardly through the cover 13 of the vessel 14 terminating in a nozzle 28 disposed above the nozzle 22 and adapted to supply a second spray 29 extending around the entire 360 degrees of the wash zone 17. This second spray constitutes a preliminary wash for the gas stream and assists in the removal of the suspended matter. The sprays from both nozzles 22 and 28 may be directed horizontally or at an upwardly or downwardly inclined angle as required and may impinge upon the inner surface of the peripheral walls of the vessel 14 for removing the particulate matter and for washing down the walls of the vessel. It is to be understood that a number of additional sprays may be displaced axially along the wash zone if required.

An inwardly directed spray 31 may be disposed in the wash zone by means of a header 32 disposed around the walls of the vessel 14 and having spray openings 33 to direct a spray radially inwardly.

This spray 31 is shown as directed to intercept the radially outward spray 23 for producing an annular impact zone 34 of a density to restrict the gas flow to provide an effect similar to a venturi. The spray 31 may, however, be staggered with respect to the sprays 23 and 29 or additional staggered sprays may be used if desired.

An additional venturi may be formed in the annular passage 37 between the core 16 and the wall of the vessel 14 by annular baffles 35 and 36 disposed in registration on the wall of the vessel 14 and the core 16 respectively. These baffles 35 and 36 may be of the usual venturi configuration to form a restricted opening 37 therebetween through which the gas stream flows at high velocity. The lower spray 23 is preferably directed to impinge on the wall 14 for wetting the same and for causing the gas stream to flow through the spray as it passes through the annular venturi opening. Additional baffles may be used in staggered relationship for deflecting the gas and liquid in a zig zag path as they advance axially along the annular passage 37.

At its lower end the walls of the vessel 14 are flared outwardly to form a coned section 41 which rests upon the top 42 of the base 25. The lower end of the core 16 is also flared outwardly to form a coned section 43 extending into and forming an air seal with the liquid in the reservoir 44. The top 42 is open in the zone between the coned sections 41 and 43 to provide a passage for the gas stream and the liquid into the reservoir 44 within the hollow base 25. The coned section 41 is shown as extending substantially above the coned section 43 and the arrangement is such that the zone of increasing area cooperates with the baffles 35 and 36 to form an annular venturi wherein the gas velocity decreases for releasing the liquid droplets which fall directly into the reservoir 44 while the gases pass above the surface of the liquid to the dryer unit to be described. While the section is shown as conical, it is obvious that other contours which are capable of producing a similar effect may be used.

The entrained particulate matter settles onto the bottom of the reservoir 44 and may be removed by a conveyor 45, having scraper blades 46, which extends along the bottom and along an upwardly sloping portion 47 of the base to a discharge point above the liquid level where the entrained particulate material is discharged into a waste line 49.

A plurality of sets of spring fingers 48 are shown as attached to the inside surface of the coned section 41 and engage the outer surface of the coned section 43 for breaking up any bubbles in the gas stream. These fingers are sufficiently flexible to be deflected by the gas stream and to prevent sediment from collecting between the ends of the fingers and the outer surface of the inner core. The action of these fingers and the relatively large area of the liquid exposed in the reservoir are adapted to reduce or eliminate the quantity of foam which might otherwise build up in the reservoir.

To remove any remaining foam and entrained solids which may be floating on the liquid in the reservoir 44, a foam collector 19 is used which comprises a set of concentric funnels 20 located at a height in the reservoir such that at least one of the funnels 20 has its opening at or slightly below the level of the floating foam. A nozzle 24 is positioned to eject liquid in a jet adapted to produce a flow for drawing floating foam into the funnels 20. The collected foam is passed through pipe 26 into the liquid in the weir 44a where it is eventually discharged into the waste pipe 49.

The liquid in reservoir 44 may be drained through pipe 29 and passed through a filter 30 and recycled to pipe 18 by pump 38.

The dryer unit 50 wherein the airborne droplets and remaining particulate matter are removed comprises a vessel 51 disposed on the base 25 at the side of the vessel 15 and open at the bottom for the reception of the gases which pass through the base above the liquid therein. At the right end of the reservoir 44 wall 51a of vessel 51 extends downwardly below the level of the liquid to provide an air seal and form a weir 44a at the discharge end. A transverse plate 52 having a plurality of sets of concentric openings 53, shown as radial, is disposed in the vessel 51 to divide the same into lower and upper compartments 54 and 55 respectively. The plate 52 is formed convex or coned for drainage of liquid toward its periphery.

Figure 2:
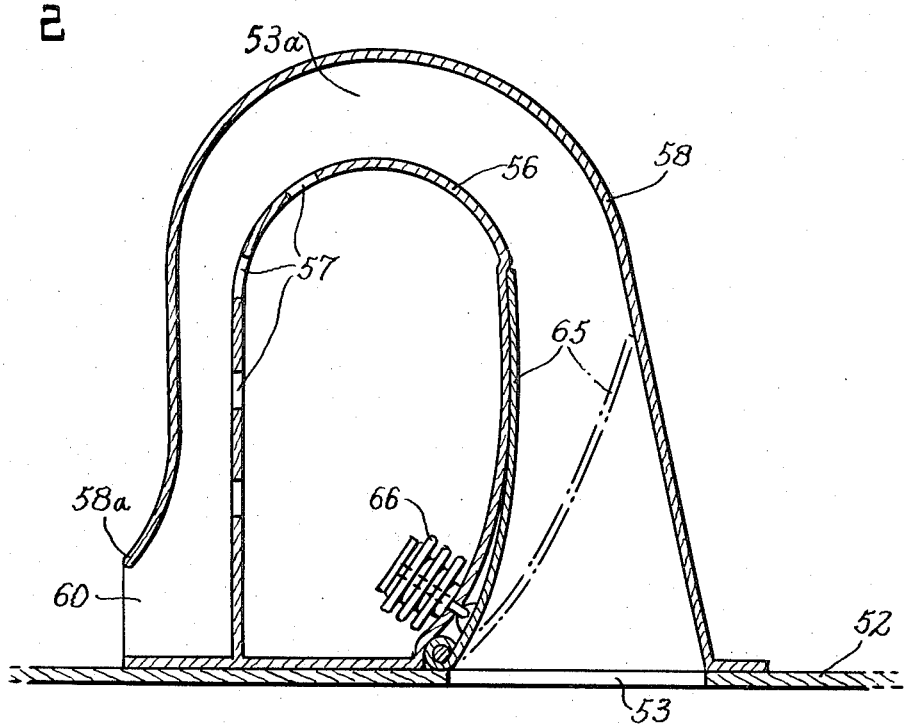
FIG. 2 is a partial section taken on the line 2—2 of FIG. 1 showing the construction of the drying unit.

As shown in FIG. 2, adjacent each of the slots 53 is a hollow baffle 56 shown as U-shaped in section which is open at its higher end 56a (FIG. 1) and is formed with openings 57 on the wall opposite the slot for the passage of gases. A deflector plate 58 is disposed adjacent the other side of each such slot 53 and is curved around the baffle 56 to form an arcuate passage 53a extending around the baffle and terminating in a lip 58a which is spaced from the plate 52 to form a restricted opening 60. The arrangement is such that as the gases pass around the arcuate passage 53a the entrained liquid droplets are caused by centrifugal force to impinge upon the deflector plate 58 and to flow along the inner surface thereof to the lip 58a from which they drop onto the plate 52.

The major portion of the dried gases are removed through the openings 57 and discharged through theopen the open 56a of the baffle 56 into the upper chamber 55. The remainder of the air passes through the elongated opening 60 into the upper chamber 55. The shape of the deflector plate 58 is preferably such that the arcuate passage 53a is of decreasing cross section as it advances to the discharge opening 60 so that the air passes along the passage 53a at increasing velocity which assists in the removal of the droplets by centrifugal force. In this way the air is substantially completely stripped of the entrained droplets as it enters the upper compartment 55.

In order to control the air flow through the openings 53, a hinged damper 65 may be disposed adjacenct the wall of the baffle 56 adjacent the slot 53 and may be controlled by suitable remote control means shown as a bellows 66 for movement between a retracted position against the wall of a baffle 56 and an extended position wherein it intercepts a selected portion of the air stream in the arcuate passage 53a as indicated in dotted lines in FIG. 2. Other control means such as a solenoid or the like may of course be substituted for the bellows 66.

The liquid collected on the plate 52 is drained into the reservoir 44 by drainage pipes 59 which extend into the liquid to form an air seal.

At its top the vessel 51 communicates with the duct 61 leading to the jacket of the heat exchanger 11. A fan 62 serves to draw the gases through the washing and drying units and to discharge the dried gas through the duct 61. A liquid spray 63 may be provided in the vessel 51 for washing and cleaning the transverse plate 52. This spray may be of the fixed or rotary type as desired. It may also be used for a final washing of the gases or for humidifying them according to the requirements of the particular installation.

While the particular forms of washing and drying units have been found to be compact, simple in structure and efficient in operation and the arrangements of units and reservoir is well adapted for the purpose intended, it is to be understood that these elements may also be used independently or in association with other types of washing and drying equipment as will be evident to a person skilled in the art.

The washing unit utilizes the kinetic energy of the spray particles and the arrangement of the spray trajectory with respect to the annular gas passage and the combination of the radial spray and annular venturi passage for the gas stream to effect an efficient removal of the suspended matter. The reversal in direction of flow of the gas as it passes from the washing unit to the reservoir and from the reservoir into the drying unit substantially removes the occluded particles from the gas stream and the deflection of the gas stream by the baffles in the dryer serves to remove any remaining entrained droplets and to effectively strip the particles from the gas before discharge.

The equipment may be used for the removal of smoke from stacks or of chemical fumes or the like. It may also be used for the chemical treatment of gases for the removal or separation of components therefrom or may be applied to various other uses as will be apparent to a person skilled in the art.

Figure 3:
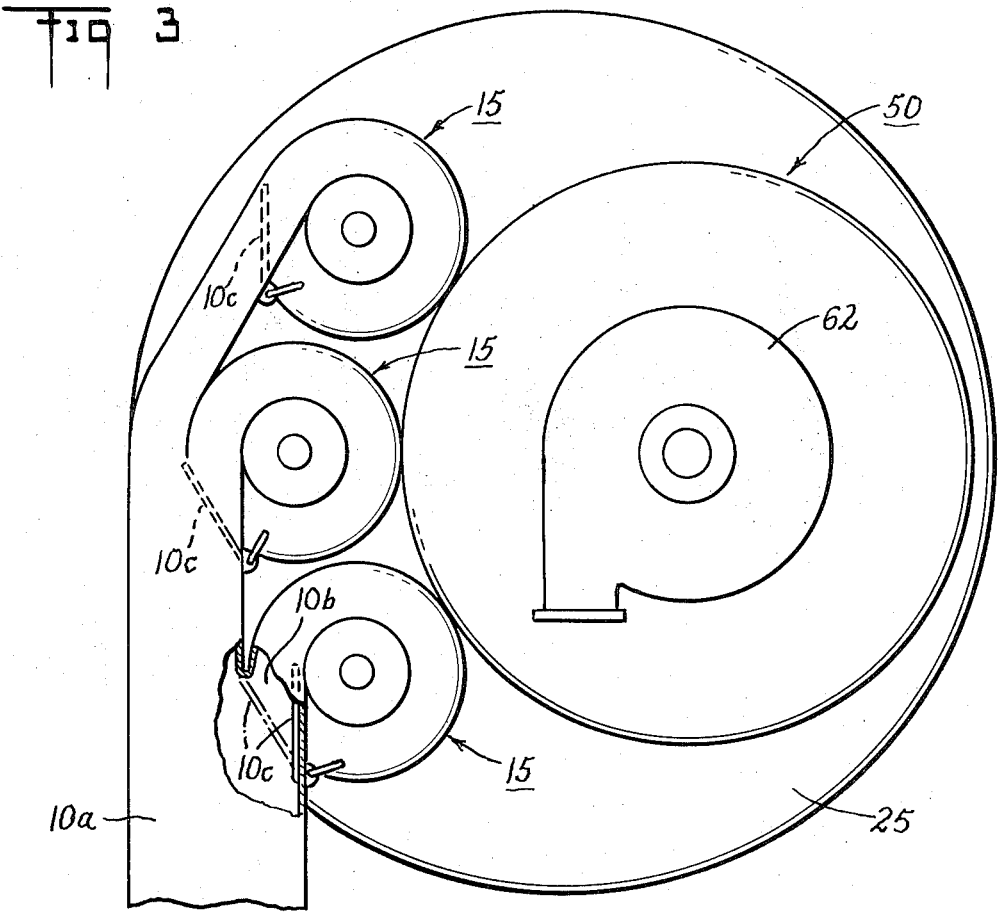
FIG. 3 is a plan view of a gas washing and drying apparatus embodying the invention wherein a plurality of washing units are disposed to cooperate with a single drying unit.

The embodiment of FIG. 3 shows a plurality of washing units 15 disposed to cooperate with a central drying unit 50. All of the units are mounted on a common base 25 and they may be enclosed in an outer shell if desired. The internal structure of each washing unit 15 and the internal structure of the drying unit 50 may be identical with that disclosed in FIG. 1 and will not be redescribed.

In FIG. 3 the gas supply duct 10a is shown as extending around the outer peripheries of the units 15 with inlets 10b leading tangentially into each unit and with the cross sectional area of the duct 10a decreasing after each such inlet. The flow of gas into the various units is controlled by dampers 10c. The duct 10a may of course be disposed to supply the gases axially to the different air washing units if the spiraling action of the gas is not required.

It is to be understood that the gases from each washing unit 15 are passed through the base 25 into the drying unit 50 which is of a suitable capacity to accomodate the gases from such units.

The embodiment of FIG. 3 is adapted for use in cases where the volume of gases to be treated may vary from time to time. This permits each unit to be used at full capacity and the throughput to be varied by introducing or removing individual units from the gas stream. Each unit may thus be adjusted for and used at its maximum efficiency at all times, the number of units which are included in the circuit being varied in accordance with the volume of gas to be treated in such a manner that each unit is continuously operated at full capacity. The dampers 10c also permit any selected unit to be closed off and taken out of service for cleaning or repair without interfering with the operation of the remaining units and without shutting down the entire system.

The embodiment of FIG. 4 is similar to that of FIG. 1 except that the washing unit 70 is disposed for the upward flow of the gas and the drying unit 50 is disposed above and in the same housing as the washing unit.

In FIG. 4 the base 25a and the reservoir are similar to the base 25 of FIG. 1 except that the gas inlet 71 is disposed in the base above the liquid level in the reservoir. The washing unit 70 includes a housing 72 disposed on the base 25a and a core 73 extending upwardly within the housing 72 and carried by a spray pipe 74 having a nozzle 75 disposed below the lower end of the core 73 and ejecting a spray around the periphery of the housing 72 across the annular passage 76. Baffles 77 and 78, similar to baffles 35 and 36 of FIG. 1 form a venturi section at the lower end of the annular passage. The annular passage 76 communicates with a chamber 79 in the drying unit 50 formed by the extension of the housing 72 which includes the traverse plate 80 and baffles 81 similar to the plate 52 and baffles 56 of FIG. 1. The dried gas is discharged from the upper chamber 82 of the unit.

This embodiment has the advantage that large objects are removed from the incoming gas stream directly into the reservoir and do not pass through the wash zone. Also the gas and spray droplets pass countercurrently through the washing zone and venturi. Of course additional sprays may be used in this form as in FIG. 1.

In FIG. 4 the washer 70 is shown with its housing 72 and the core 73 as cylindrical and concentric. The upper portion is shown as straight, but may be flared outwardly to correspond to the coned sections 41, 43 of FIG. 1.

While a specific embodiment has been set forth, it is to be understood that the details of construction and the arrangement of parts may be varied within the scope of the invention which is to be limited only in accordance with the following claims.

We claim:

1. Apparatus for cleaning gases comprising a vessel having peripheral walls, an inlet communicating with said vessel for introducing gases to be cleaned, an axial core member disposed in said vessel and forming with said walls an annular gas passage, and means directing a liquid spray across said annular gas passage for thereby forming a spray zone wherein entrained matter is removed from said gases, means for collecting said liquid spray, a drying means communicating with said vessel to receive gases therefrom including a plate having at least one slot therein, a centrifugal separator disposed on said slot in flow communication therewith including an outer wall on one side of the slot and an inner hollow wall defining a gas outlet, said inner wall spaced from the outer wall with the outer wall extending over the inner wall to form an arcuate path therebetween, a liquid outlet defined by an end of the outer wall remote from the inlet, a series of openings gas inlet on the inner wall remote from the inlet, said inner wall having a gas outlet opening spaced from the gas inlet openings and liquid outlet whereby gas passes through said openings and liquid passes out said outlet, and a gas outlet communicating with said drying means for removing cleaned and dried gases.

2. Apparatus as set forth in claim 1 in which said spray means includes a fixed axial spray nozzle disposed to project a spray outwardly through said gas stream.

3. Apparatus as set forth in claim 1 in which said spray means includes a series of peripherally spaced spray openings and means disposed to eject a liquid spray inwardly from said openings across the path of said gas stream.

4. Apparatus as set forth in claim 1 in which a plurality of spray nozzles are displaced axially along said gas path and are adapted to eject a liquid spray through said gas stream.

5. Apparatus as set forth in claim 1 including an axially disposed spray nozzle adapted to eject a spray outwardly through said gas stream and a set of peripherally disposed spray openings disposed to eject a spray inwardly across said gas stream.

6. Apparatus as set forth in claim 5 in which said nozzles are axially displaced.

7. Apparatus as set forth in claim 5 in which said nozzles are disposed in transverse alignment whereby the inwardly directed and outwardly directed sprays impinge to form an annular zone of concentrated liquid spray through which said gases pass.

8. Apparatus as set forth in claim 1 including at least one additional spray means disposed to eject a spray through said gas stream in advance of said first mentioned spray zone.

9. Apparatus as set forth in claim 1 including means for supplying said gases tangentially into said vessel for causing said gases to pass along said annular passage in a helical path.

10. Apparatus as set forth in claim 1 in which said passage is flared radially for increasing the cross sectional area thereof as the gas advances to the discharge end thereof.

11. Apparatus as set forth in claim 10 in which the walls of said vessel are flared outwardly toward the discharge end thereof.

12. Apparatus as set forth in claim 1 wherein said plate has a plurality of said slots therein with a separator disposed on each of said slots.

13. Apparatus as set forth in claim 1 wherein said passage has an annular restriction therein forming an annular venturi throat.

14. Apparatus for cleaning gases comprising a vessel having peripheral walls, an inlet communicating with said vessel for introducing gases to be cleaned, an axial core member disposed in said vessel and forming with said walls an annular gas passage, means supplying wash liquid to said passage, a reservoir disposed across the discharge end of said vessel to receive said wash liquid, a drying means communicating with the discharge end of said vessel to receive gases therefrom including a plate having at least one slot therein, a centrifugal separator disposed on said slot in flow communication therewith including an outer wall on one side of said slot and an inner hollow wall defining a gas outlet, said inner wall spaced from the outer wall with the outer wall extending over the inner wall to form an arcuate path therebetween, a liquid outlet defined by an end of the outer wall remote from the inlet, a series of gas inlet openings on the inner wall remote from the inlet, said inner wall having a gas outlet opening spaced from the gas inlet openings and liquid outlet whereby gas passes through said openings and liquid passes out said outlet, and a gas outlet communicating with said drying means for removing cleaned and dried gases.

15. Apparatus as set forth in claim 14 wherein said plate has a plurality of said slots therein with a separator disposed on each of said slots.

16. Apparatus as set forth in claim 14 in which said reservoir comprises a hollow base on which said vessel rests.

17. Apparatus as set forth in claim 16 in which a conveyor is disposed in said base, said conveyor having scraping means to remove deposited material from said reservoir.

18. Apparatus as set forth in claim 14 including spring fingers disposed around said annular passage and extending across the path of the gas stream therein for breaking up suspended bubbles in the gas stream in advance of the discharge end of said passage.

19. Apparatus as set forth in claim 18 in which the walls of said vessel diverge outwardly at the lower end thereof for increasing the transverse area of said annular passage and providing increased surface area in said reservoir in which the foam may be broken down.

20. Apparatus as set forth in claim 14 including an inlet duct and an outlet duct and heat exchange means connected thereto.

21. Apparatus as set forth in claim 14 including means for withdrawing liquid from said collecting means and recycling the same as wash liquid.

22. Apparatus as set forth in claim 14 wherein said passage has an annular restriction therein forming an annular venturi throat.

23. A gas centrifugal drying unit comprising a vessel having a transverse plate dividing said vessel into inlet and discharge chambers, said plate having an elongated opening for the passage of gas and centrifugal separators for drying the gas, each of said separators comprising a hollow U-shaped baffle connected to said plate at the legs of the U disposed along one side of said openings and having oppositely disposed side walls, the side wall away from said opening having a series of holes therein for the passage of gas, said hollow baffle being open at one end for the discharge of such gas into said discharge compartment, and a curved deflector plate extending from said transverse plate on the side of said opening opposite said baffle and extending over and around said baffle to form an arcuate passage for gas and entrained liquid therebetween and terminating in a lip spaced above said transverse plate on the side of said baffle opposite said opening, the arrangmenet being such that entrained liquid is caused by centrifugal force to impinge upon and flow along the inner surface of said deflector plate in an arcuate path and to fall from said lip onto said transverse plate while a portion of the gas from which the liquid has been stripped flows into said hollow baffle and from the open end thereof into said discharge compartment and the remainder of said gas flows through the opening between said lip and said transverse plate into said last mentioned compartment.

24. A unit as set forth in claim 23 in which said transverse plate and baffle are upwardly inclined toward the open end of said baffle and means is provided to remove separated liquid from the lower portion of said transverse plate.

25. A unit as set forth in claim 23 in which said arcuate passage is of decreasing cross-section toward the discharge lip thereof for passing gases therealong at increasing velocity.

26. A unit as set forth in claim 23 including an adjustable damper disposed adjacent said baffle and positioned to control the gas flow through said arcuate passage.

27. A drying unit for removing entrained matter from gases comprising a vessel having peripheral walls, a transverse plate extending across said vessel to divide the same into inlet and outlet compartments, said plate having at least one slot through which the gases pass, a hollow baffle disposed on said plate adjacent said slot, a deflector vane defining a housing extending from said plate disposed on the opposite side of said slot and extending over the adjacent baffle surface to form an arcuate path therebetween to deflect the gases and entrained liquid thereover in an arcuate path, said baffle having a wall with gas inlet openings opposed to the slot and remote therefrom for the passage of gas, said vanes extending over said openings, and said housing having an open end for the discharge of collected liquids said inner wall having a gas outlet opening spaced from the gas inlet openings and the open end of the housing.

28. Apparatus as set forth in claim 27 wherein said plate has a series of said slots and a series of said baffles and said vanes disposed thereon adjacent each of said slots.

29. Apparatus as set forth in claim 27 in which said plate is inclined downwardly at its periphery for the collection of the separated liquid.

30. Apparatus as set forth in claim 27 in which said drying vessel is disposed on a hollow base forming a reservoir adapted to receive the collected liquid.

31. Apparatus as set forth in claim 29 including at least one drainage pipe extending downwardly from the periphery of said plate into the liquid in the reservoir.

32. Apparatus as set forth in claim 29 in which said drying vessel is disposed on a hollow base forming a reservoir containing separated liquid and said pipe extends into the liquid in said reservoir.

33. Apparatus for washing and drying gases comprising a hollow base forming a reservoir for liquids, a gas washing unit comprising a vessel having peripheral walls disposed on said base and communicating therewith to receive gases therefrom, said base having a gas inlet opening above the level of the liquid thereon for passing gases over said liquid into said vessel for washing, said vessel having a central axial core forming with said walls an annular gas passage wherein the gases pass upwardly from said base, means disposed to supply a wash liquid to said passage and drying means in said vessel above said annular gas passage including a transverse plate extending across said vessel to divide the same into inlet and outlet compartments, said plate having at least one slot through which the gases pass, a hollow baffle disposed on said plate adjacent said slot, a deflector vane defining a housing extending from said plate disposed on the opposite side of said slot and extending over the adjacent baffle surface to form an arcuate path therebetween to deflect the gases and entrained liquid thereover in an arcuate path, said baffle having a wall with gas inlet openings opposed to the slot and remote therefrom for the passage of gas, said vanes extending over said openings and said housing having an open end for the discharge of collected liquids said inner wall having a gas outlet opening spaced from the gas inlet openings and the open end of the housing.

34. Apparatus for washing and drying gases as set forth in claim 33 in which an annular restriction is disposed in said gas passage forming an annular venturi through which said gases pass.

35. Apparatus for washing and drying gases as set forth in claim 33 in which spray means is disposed to pass said wash liquid in the form of a spray through the gas stream in said passage.

36. Apparatus as set forth in claim 33 wherein said plate has a series of said slots and a series of said baffles and said vanes disposed thereon adjacent each of said slots.

* * * * *